United States Patent
Liu et al.

(10) Patent No.: US 7,834,606 B2
(45) Date of Patent: Nov. 16, 2010

(54) CONTROL CIRCUIT AND METHOD FOR A CONSTANT ON-TIME PWM SWITCHING CONVERTER

(75) Inventors: Kuo-Ping Liu, Hsinchu (TW); Ko-Cheng Wang, Puli Township, Nantou County (TW); Liang-Pin Tai, Tainan (TW); Chung-Sheng Cheng, Jhubei (TW)

(73) Assignee: Richtek Technology Corp., Hsinchu (TW)

( * ) Notice: Subject to any disclaimer, the term of this patent is extended or adjusted under 35 U.S.C. 154(b) by 567 days.

(21) Appl. No.: 11/882,485

(22) Filed: Aug. 2, 2007

(65) Prior Publication Data
US 2008/0030181 A1 Feb. 7, 2008

(30) Foreign Application Priority Data
Aug. 4, 2006 (TW) .............................. 95128707 A
Jul. 13, 2007 (TW) .............................. 96125665 A (51) Int. Cl.
*G05F 1/00* (2006.01)
(52) U.S. Cl. ...................................... 323/283

(58) Field of Classification Search ................. 323/222, 323/351, 282, 283, 288; 363/15, 124
See application file for complete search history.

(56) References Cited

U.S. PATENT DOCUMENTS

| | | | | |
|---|---|---|---|---|
| 5,757,214 A | * | 5/1998 | Stoddard et al. | 327/110 |
| 5,939,938 A | * | 8/1999 | Kalb et al. | 330/51 |
| 6,064,187 A | * | 5/2000 | Redl et al. | 323/285 |
| 6,307,356 B1 | * | 10/2001 | Dwelley | 323/282 |
| 6,972,969 B1 | * | 12/2005 | Shteynberg et al. | 363/21.12 |
| 7,109,692 B1 | * | 9/2006 | Wu et al. | 323/282 |
| 7,274,182 B2 | * | 9/2007 | Huang | 323/284 |
| 2008/0030181 A1 | * | 2/2008 | Liu et al. | 323/283 |

* cited by examiner

*Primary Examiner*—Adolf Berhane
*Assistant Examiner*—Yemane Mehari
(74) *Attorney, Agent, or Firm*—Rosenberg, Klein & Lee (57) ABSTRACT

A control circuit provides a control signal for a constant on-time PWM switching converter to produce an output voltage, such that the converter operates with a constant on-time at a first state and operates with a variable on-time at a second state, so as to decrease the switching frequency and thereby the switching loss, to increase the efficiency of the converter, to improve the transient response, and to reduce the recovery time of the output voltage.

32 Claims, 11 Drawing Sheets

CONTROL CIRCUIT AND METHOD FOR A CONSTANT ON-TIME PWM SWITCHING CONVERTER

FIELD OF THE INVENTION

The present invention is related generally to a power converter and, more particularly, to a constant on-time pulse width modulation (PWM) switching converter.

BACKGROUND OF THE INVENTION

Figure 1:
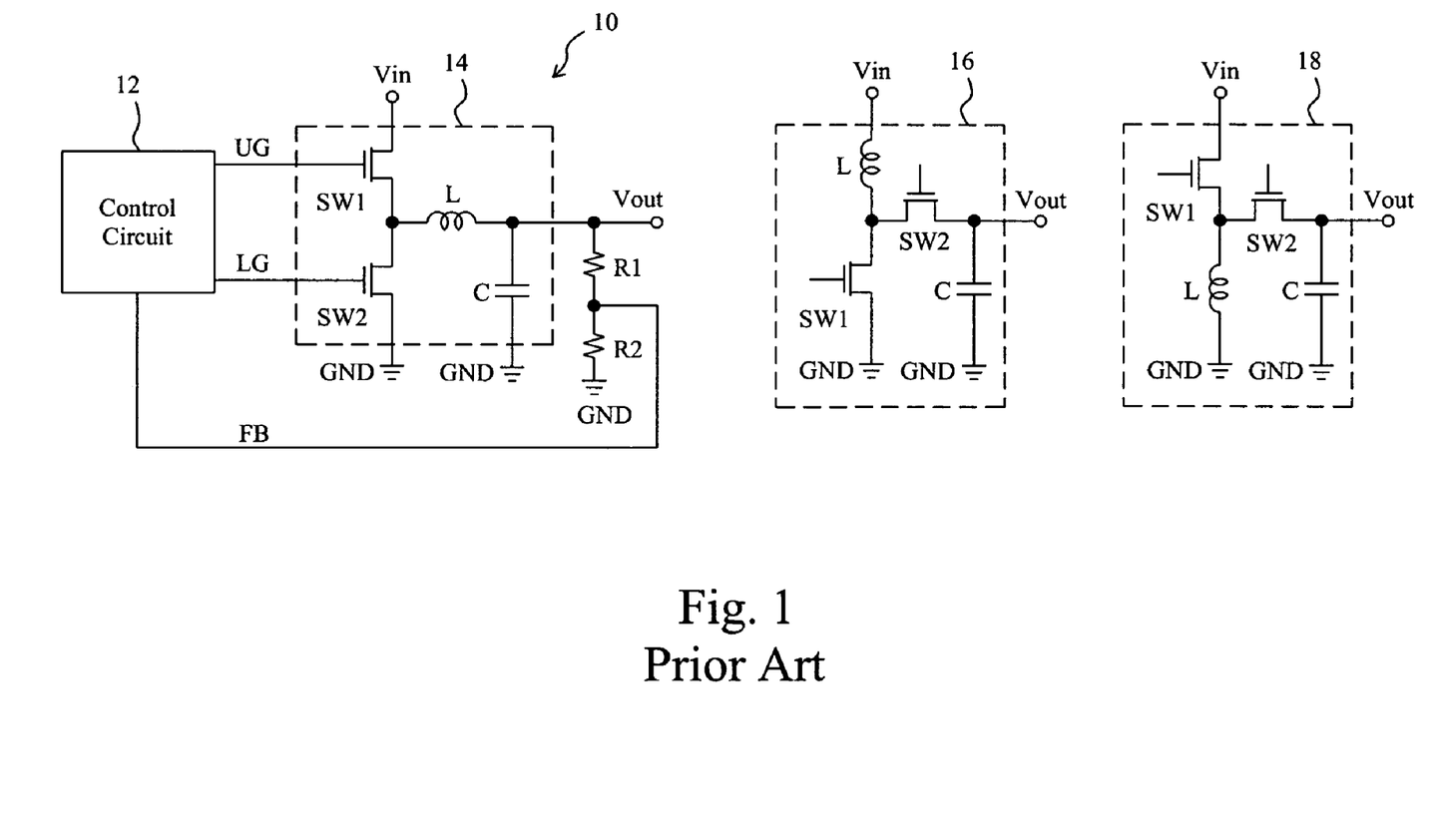
FIG. 1 shows a conventional switching converter.

Switching converters are widely used in various electronic products for providing stable direct-current (DC) voltages for load circuits such as central processing unit (CPU). FIG. 1 shows a conventional synchronous buck converter 10, in which a control circuit 12 produces two control signals UG and LG to switch an upper switch SW1 and a lower switch SW2 in a power stage 14 so as to convert an input voltage Vin to an output voltage Vout, and by detecting the output voltage Vout a feedback signal FB is fed back to the control circuit 12 for regulating the output voltage Vout. FIG. 1 also shows a power stage 16 of a synchronous boost converter and a power stage 18 of a synchronous inverting converter. If the switches SW2 in the power stages 14-18 are replaced by diodes, these converters will be asynchronous ones. It is well know by those skilled in the art that there had been many control methods for these converters.

Figure 2:
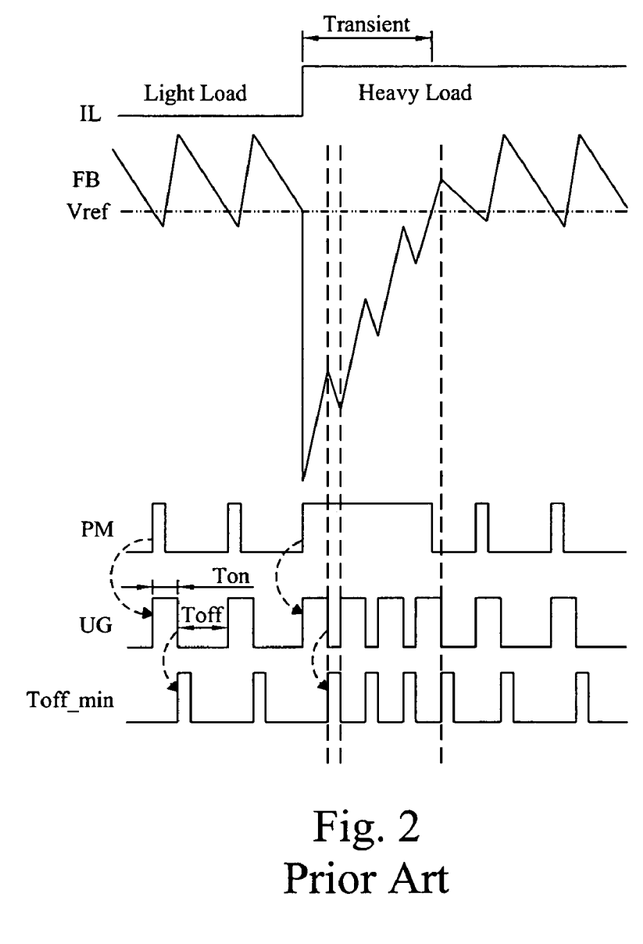
FIG. 2 shows a conventional control method for a constant on-time PWM.

FIG. 2 shows a conventional control method for a constant on-time PWM switching converter. In steady state, each switching cycle of the control signal UG has a constant on-time Ton followed by an off-time Toff. The power switch controlled by the control signal UG is turned on during the on-time Ton, and is turned off during the off-time Toff. The process of producing the on-time is described as below. The control circuit 12 compares the feedback signal FB with a reference signal Vref to produce a pulse modulation signal PM. When the feedback signal FB decreases lower than the reference signal Vref with the decreasing output voltage Vout, the pulse modulation signal PM will change to high level, so as to trigger the on-time Ton. During the on-time Ton, the feedback signal FB gradually rises up with the gradually rising output voltage Vout, and when it becomes higher than the reference signal Vref again, the pulse modulation signal PM changes back to low level, but the on-time Ton still keeps, hence the output voltage Vout keeps rising up until the on-time Ton terminates when it reaches the default length, and then gradually decreases again thereafter. When the on-time Ton terminates, the control signal UG falls down to low level, so triggering a minimum off-time Toff_min. When the minimum off-time Toff_min terminates, the feedback signal FB is still higher than the reference signal Vref, so the control signal UG is also still at low level. The control signal UG keeps at low level until the next time the feedback signal FB decreases lower than the reference signal Vref, which changes the pulse modulation signal PM to high level and so triggers the on-time Ton again.

When the load changes from light to heavy, the load current Io increases rapidly, causing the output voltage Vout and thereby the feedback signal FB dropping down rapidly. The pulse modulation signal PM will keep at high level until the feedback signal FB increases higher than the reference signal Vref again. It causes that in the control signal UG, the constant on-time Ton and the minimum off-time Toff_min are alternatively triggered instantly, without more time therebetween for the off-time, which increases the switching frequency during the transient state, resulting in more switching loss of the switches SW1 and SW2, and so decreasing the efficiency of the converter. Moreover, during the transient state, because the on-time Ton for the output voltage Vout to increase is constant, it needs more switching cycles or longer time interval for the output voltage Vout to recover to the previous level, and thus the response to the load transient will be slow.

Therefore, it is desired a control circuit and method for a constant on-time PWM switching converter with decreased switching frequency in the transient state and reduced recovery time for the output voltage.

SUMMARY OF THE INVENTION

An object of the present invention is to provide a control circuit and method for decreasing the switching frequency in a transient state of a constant on-time PWM switching converter.

Another object of the present invention is to provide a control circuit and method for decreasing the switching loss in a transient state of a constant on-time PWM switching converter.

Still another object of the present invention is to provide a control circuit and method for improving the efficient of a constant on-time PWM switching converter.

Yet another object of the present invention is to provide a control circuit and method for reducing the recovery time of a constant on-time PWM switching converter.

Still yet another object of the present invention is to provide a control circuit and method for speeding up the transient response of a constant on-time PWM switching converter.

A further object of the present invention is to provide a control circuit and method for producing an on-time for a constant on-time PWM switching converter.

According to the present invention, a control circuit and method produces two signals to trigger and terminate an on-time for a constant on-time PWM switching converter. In a load transient, the on-time is prolonged so as to decrease the switching frequency and thereby the switching loss, to increase the efficiency of the converter, to improve the transient response, and to reduce the recovery time.

In one embodiment, the control circuit and method produce two reset signals, one for terminating the on-time in steady state, and the other for terminating the on-time in load transient, depending on a selection.

In one embodiment, the control circuit and method determine a constant on-time and a variable on-time in response to a load transient. In steady state, the constant on-time is provided for the converter, and in load transient, the variable on-time is provided instead.

According to the present invention, a control circuit and method produce a control signal for a constant on-time PWM switching converter, such that the converter operates with a constant on-time in a first state, and operates with a modulated on-time in a second state. The modulated on-time is longer than the constant on-time, but not longer than a maximum.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
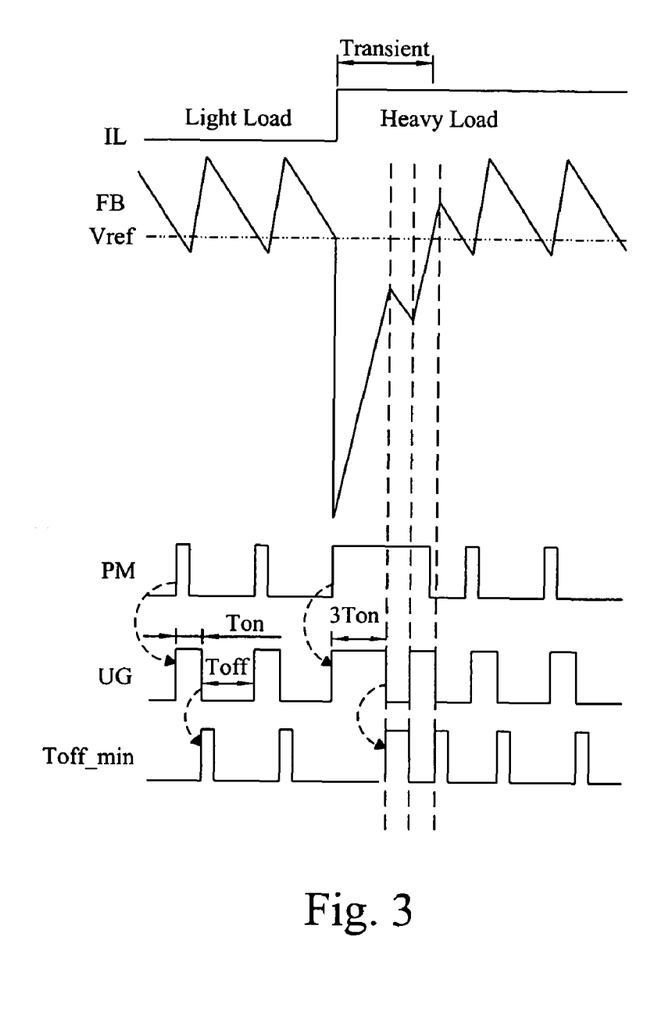
FIG. 3 shows a control method for a constant on-time PWM according to the present invention.

FIG. 3 shows a control method for a constant on-time PWM switching converter according to the present invention. In steady state, the operation of a constant on-time PWM switching converter under this control is the same as that of FIG. 2, i.e., a constant on-time Ton is followed by an off-time Toff, and the off-time Toff is terminated when the next on-time Ton is triggered. Whereas, in load transient, the on-time will be prolonged if the pulse modulation signal PM is still at high level. The length of the on-time can be prolonged to be infinite, or to be shorter than a predetermined limit, for example the triple of the constant on-time Ton, i.e., 3Ton. When a load transient happens, the feedback signal FB falls down lower than the reference signal Vref, which triggers the pulse modulation signal PM to high level, and further triggers the control signal UG to high level. The control signal UG keeps at high level until the prolonged on-time reaches the predetermined maximum, for example 3Ton, and then falls back to low level thereafter. An off-time Toff follows the prolonged on-time 3Ton. According to the present invention, the minimum off-time Toff_min can be changed with the change of the on-time. For example, the minimum off-time Toff_min is modulated if the prolonged on-time exceeds a threshold. In this embodiment, the threshold is equal to the maximum on-time 3Ton, that is, the minimum off-time Toff_min will be prolonged if the prolonged on-time reaches the predetermined maximum on-time 3Ton, as shown in FIG. 3, in order to prevent over current and overshoot of the output voltage Vout. The prolonged time can be determined according to the requirements of circuit designer or uses. When the off-time Toff terminates, the pulse modulation signal PM is still at high level and causes the on-time being triggered and kept again. Then, the feedback signal FB increases higher than the reference Vref before the prolonged on-time reaches the maximum 3Ton, so the pulse modulation signal PM falls down to low level. At this time, in this embodiment, if the on-time has exceeded the constant on-time Ton, the on-time will be terminated immediately no matter it reaches any multiple of Ton or not; otherwise, the on-time will be kept until it reaches the constant on-time Ton. In other words, the on-time is limited between the minimum Ton and the maximum 3Ton. The minimum and the maximum for the on-time can be set to be other values according to the user's requirements. Besides, if the on-time is longer than the minimum, it will change back to be with the constant on-time Ton in steady state after the next time the feedback signal FB decreases lower than the reference signal Vref, as long as no load transient happens again. The present invention can be applied to various switching converters, such as boost converter, buck converter, and inverting converter. By prolonging the on-time in transient state, the switching frequency is decreased, which reduces the switching loss and improves the converting efficiency. Moreover, because the output voltage Vout can be recovered to the previous level more quickly, the transient response is speeded up and the transient interval is also shortened.

Figure 4:
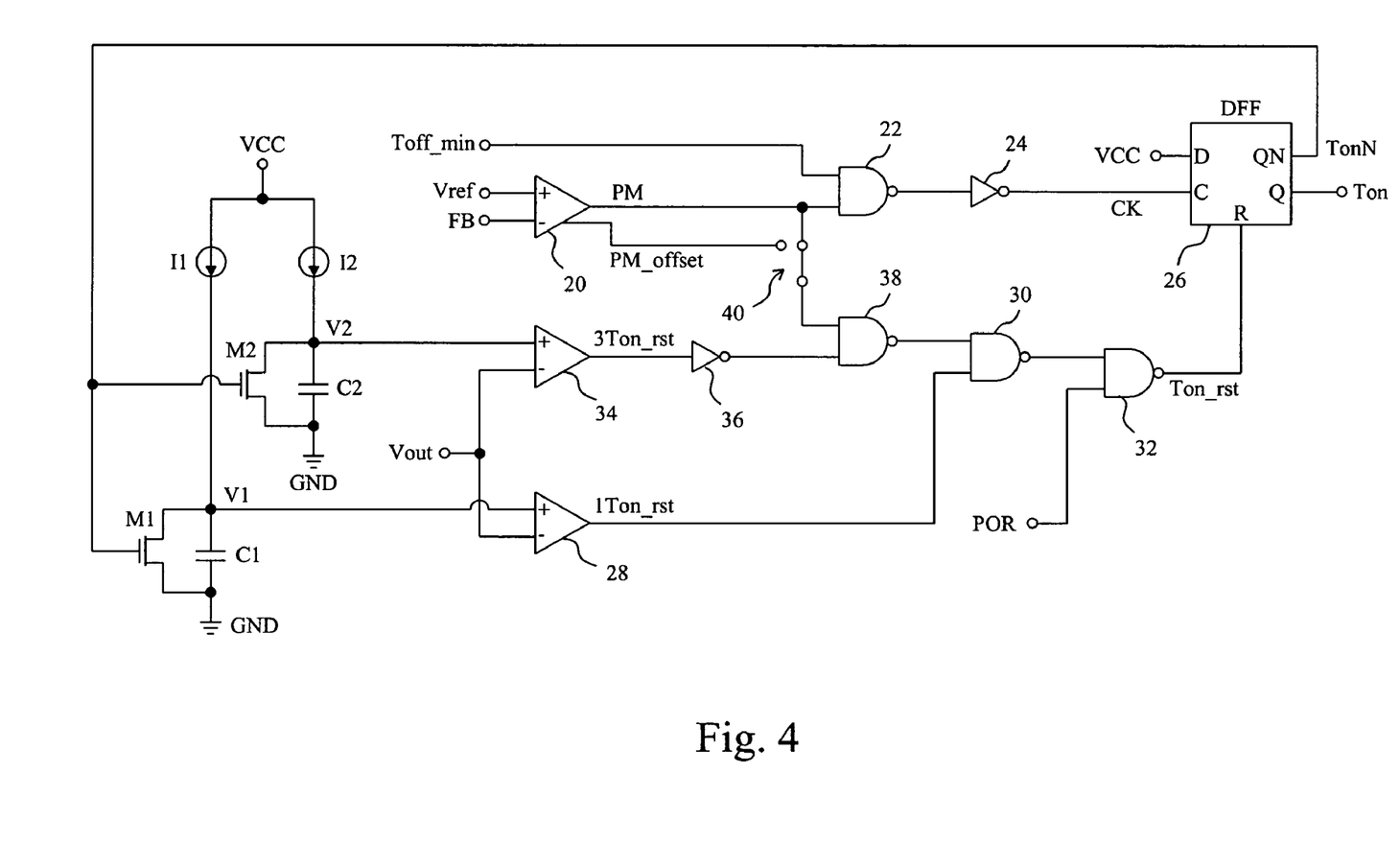
FIG. 4 shows a control circuit for a constant on-time PWM according to the present invention.

FIG. 4 shows a control circuit according to the present invention, in which a comparator 20 compares a feedback signal FB with a reference signal Vref to produce a pulse modulation PM, a NAND gate 22 determines an output according to the pulse modulation signal PM and a minimum off-time signal Toff_min, which is inverted by an inverter 24 and sent to a clock input C of a D-type flip-flop 26 to trigger the on-time. The minimum off-time signal Toff_min ensures that a minimum off-time Toff_min follows each on-time. As shown in FIG. 3, the minimum off-time Toff_min can be prolonged in load transient by changing the minimum off-time signal Toff_min in load transient. Besides, the termination of the on-time is determined by a reset signal Ton_rst connected to a reset input R of the D-type flip-flop 26. The process of producing the reset signal Ton_rst is described as below.

For producing the constant on-time Ton in steady state, a current I1 provided by a current source I1 charges a capacitor C1 to produce a charged voltage V1, and a transistor M1 is parallel connected to the capacitor C1 to serve as a switch, whose gate is connected with a complementary signal TonN which is complementary to the on-time signal Ton. When the signal Ton is high, the signal TonN is low, so the transistor M1 is turned off, and the capacitor C1 is charged. The charging time is determined by the length of the on-time Ton. On the contrary, after terminating an on-time, the signal TonN changes to high, so the transistor M1 is turned on and the capacitor C1 is discharged, until the next on-time is triggered again and the capacitor C1 will be charged again. A comparator 28 compares the charged voltage V1 produced by the capacitor C1 with the output voltage Vout to produce a reset signal 1Ton_rst. In steady state, the reset signal 1Ton_rst is used as the reset signal Ton_rst by two NAND gates 30 and 32 to input into the D-type flip-flop 26, so as to determine a constant on-time Ton. If the charging time of the capacitor C1 is represent by t, the charged voltage is $$V1 = C1 \times (I1 \times t). \qquad [EQ\text{-}1]$$

When the voltage V1 reaches the voltage Vout, the reset signal 1Ton_rst terminates the on-time Ton. Therefore, it can be known by the equation EQ-1 that $$Vout = C1 \times I1 \times Ton. \qquad [EQ\text{-}2]$$

It can be rewritten as $$C1 \times I1 = Vout/Ton. \qquad [EQ\text{-}3]$$

On the other hand, for tripling the on-time Ton in load transient, a current I2 provided by a current source I2 charges a capacitor C2 to produce a charge voltage V2, a transistor M2 whose gate is also connected with the complementary signal TonN of the on-time signal Ton works as a switch and is parallel connected to the capacitor C2. When the signal Ton is high, the signal TonN is low, so the transistor M2 is turned off, and the capacitor C2 is charged. The charging time is determined by the length of the on-time Ton. On the contrary, after terminating the on-time Ton, the signal TonN changes to high, so the transistor M2 is turned on, and the capacitor C2 is discharged until the next on-time is triggered, and then is charged thereafter. A comparator 34 compares the charged voltage V2 produced by the capacitor C2 with the output voltage Vout to produce a reset signal 3Ton_rst. For prolonging the on-time Ton, the increasing speed of the charged voltage V2 to reach the output voltage Vout is slower than that of the voltage V1. It can be inferred by the equation EQ-3 that $$Vout/3Ton = C2 \times I2. \quad [EQ\text{-}4]$$

Figure 5:
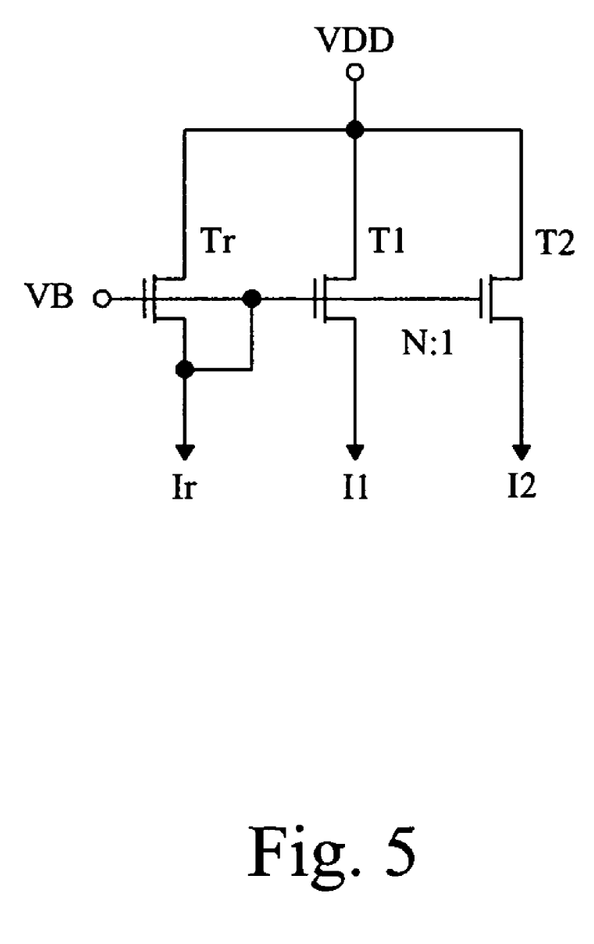
FIG. 5 shows an embodiment for the proportional current source of FIG. 4.

In one embodiment, C1=C2 and I1=3×I2. FIG. 5 provides an embodiment for the needed current source, in which three transistors Tr, T1, and T2 are configured as a current mirror, the transistor Tr establishes a reference current Ir, the transistor T1 mirrors the current Ir to produce the current I1, and the transistor T2 mirrors the current Ir to produce the current I2. The size ratio of the transistor T1 and the transistor T2 is N:1, hence the current ratio I1:I2=N:1. By selecting N=3, the current I1 is triple times of the current I2. Referring to FIG. 4 again, in another embodiment, I1=I2 and C1=3×C2. In other embodiments, the designer can determine the related parameters according to the equations EQ-3 and EQ-4. If the on-time Ton for load transient is desired to be prolonged to be N times of the constant on-time Ton in steady state, C1×I1=N×C2×I2 can be set. Briefly, different values of the currents I1 and I2 or the capacitors C1 and C2 can be used to accomplish different increasing speeds of the voltages V1 and V2 to reach the output voltage Vout, and further to control the maximum of the on-time Ton in load transient. This embodiment also shows that increasing some similar charge circuits or switching the current I2 to different values can provide various on-time maximum for use in load transient. The reset signal 3Ton_rst produced by the comparator 34 is inverted by an inverter 36 and outputted to a NAND gate 38, and a signal PM_offset provided by the comparator 20 controls a relay 40 to determine the pulse modulation signal PM to connect to the NAND gate 38 or not. Briefly, the NAND gates 38 and 30 are used to select one signal either 1Ton_rst or 3Ton_rst to be the reset signal Ton_rst for the D-type flip-flop 26. In steady state, the relay 40 is tripped, causing an open circuit between the output PM of the comparator 20 and the input of the NAND gate 38, so the reset signal 3Ton_rst is blocked by the NAND gate 38 and therefore, the on-time Ton will be terminated by the reset signal 1Ton_rst by resetting the D-type flip-flop 26. In load transient, the signal PM_offset closes the relay 40, so the modulation signal PM is connected to the input of the NAND gate 38, and the high level of the modulation signal PM will allow the reset signal 3Ton_rst to pass through the NAND gate 38 to override the reset signal 1Ton_rst by the NAND gate 30 to reset the D-type flip-flop 26, so as to terminate the termination of the on-time Ton. The prolonged on-time 3Ton only determines the maximum of the on-time Ton in load transient. If the feedback signal FB has increased higher than the reference signal Vref before the on-time Ton reaches the maximum, it causes the pulse modulation signal PM falls down to low level, and the reset signal 3Ton_rst will be blocked by the NAND gate 38. In this case, the length of the on-time Ton is determined by the length which has been kept. If the length which has been kept longer than the length of the constant on-time Ton for steady state, the on-time Ton will be terminated; otherwise, the on-time Ton will be kept until its length of time reaches the constant length Ton. In other words, in load transient, the length of the last on-time Ton would not shorter than the length Ton for steady state. The another input of the NAND gate 32 is connected with a power-on-rest signal POR, a signal for resetting Ton before the power on is ready, for controlling the passing of the reset signal 1Ton_rst to the D-type flip-flop 26.

The circuit for determining the on-time Ton shown in FIG. 4 is only a simple example. In other embodiments, the control method of FIG. 3 can be implemented by a circuit providing the on-times with at least two different lengths, one for steady state and the other for load transient.

To take the buck converter 10 of FIG. 1 as an example, the voltage conversion ratio determines the duty $$D = Vout/Vin, \quad [EQ\text{-}5]$$

and $$D = Ton/Ts = Ton \times fs, \quad [EQ\text{-}6]$$

where Ts is the switching period, and fs is the switching frequency. It can be derived from the equations EQ-5 and EQ-6 that $$Ton = (Vout/Vin)/fs. \quad [EQ\text{-}7]$$

If the input voltage Vin=12V, the output voltage Vout=3V, and the switching frequency=500 kHz, then the constant on-time Ton for steady state is $$\begin{aligned} Ton &= (3/12)500\text{ k} \\ &= 0.5\text{ μs}, \end{aligned} \quad [EQ\text{-}8]$$

and the switching period is $$\begin{aligned} Ts &= 1/500\text{ k} \\ &= 2\text{ μs}. \end{aligned} \quad [EQ\text{-}9]$$

Therefore, the off-time for steady state is $$\begin{aligned} Toff &= Ts - Ton \\ &= 1.5\text{ μs}. \end{aligned} \quad [EQ\text{-}10]$$

If the minimum off-time Toff_min=0.5 μs, the conventional switching period in load transient is $$\begin{aligned} Ts &= Ton + Toff\_min \\ &= 1\text{ μs}. \end{aligned} \quad [EQ\text{-}11]$$

Therefore the conventional switching frequency is $$\begin{aligned} fs &= 1/1\text{ μs} \\ &= 1\text{ MHz}. \end{aligned} \quad [EQ\text{-}12]$$

If using the control method of FIG. 3, the switching period for load transient will be $$Ts = 3Ton + \text{Toff\_min} \quad\quad\quad [\text{EQ-13}]$$
$$= 2 \text{ μs}.$$

Therefore the switching frequency is $$fs = 1/2 \text{ μs} \quad\quad\quad [\text{EQ-14}]$$
$$= 500 \text{ kHz}$$

The data are collected in Table 1 for comparison.

TABLE 1

| | on-time (Ton) | off-time (Toff) | Switching frequency (fs) |
|---|---|---|---|
| Steady State | 0.5 μs | 1.5 μs | 500 kHz |
| Transient State (using Ton) | 0.5 μs | 0.5 μs | 1 MHz |
| Transient State (using 3 Ton) | 1.5 μs | 0.5 μs | 500 kHz |

As shown in Table 1, in load transient, the conventional switching frequency increases from 500 kHz to 1 MHz, whereas the switching frequency of the above embodiment according to the present invention keeps at 500 kHz, so reducing the switching loss dramatically.

Figure 6:
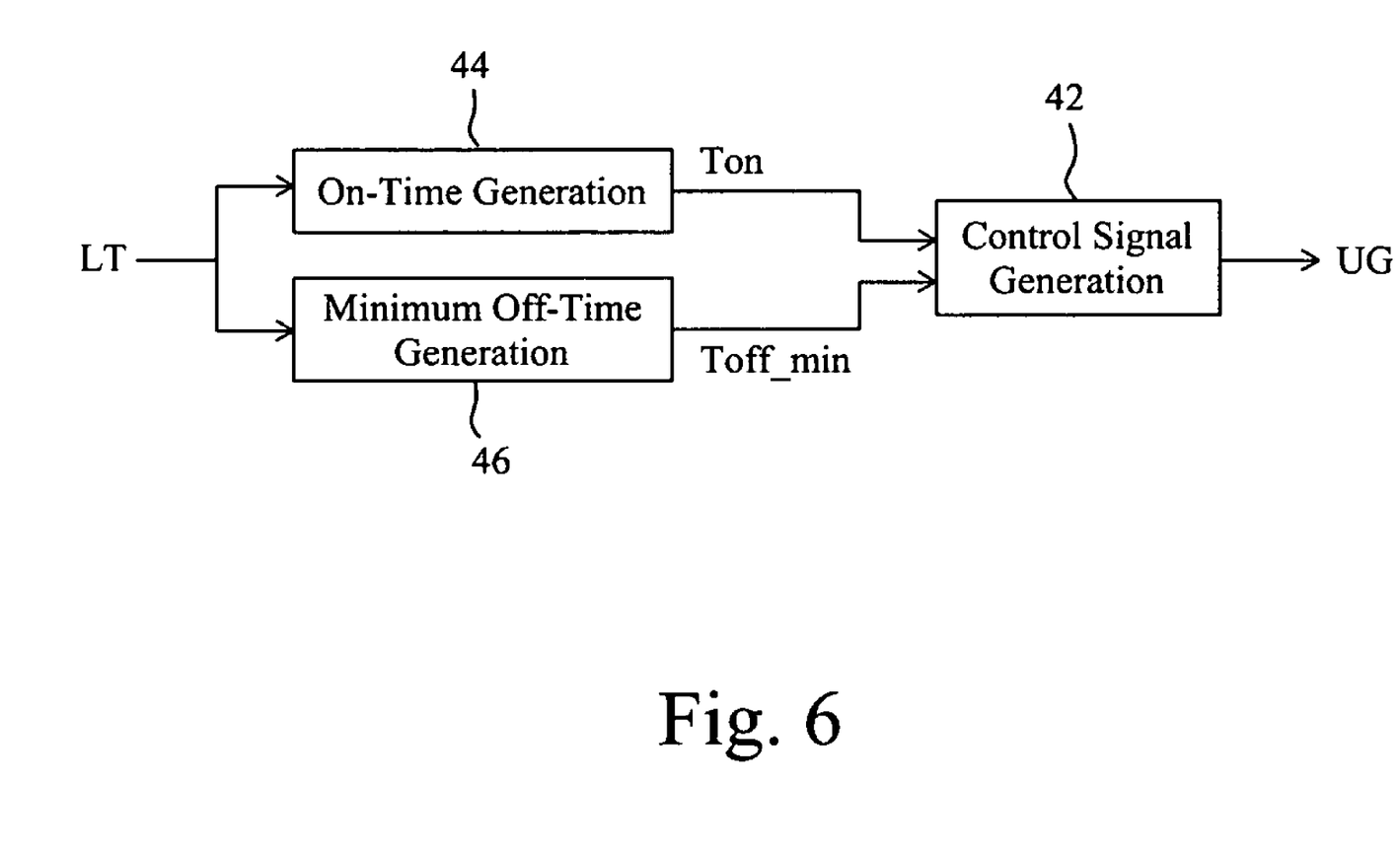
FIG. 6 shows a systematic block diagram according to the present invention.
Figure 7:
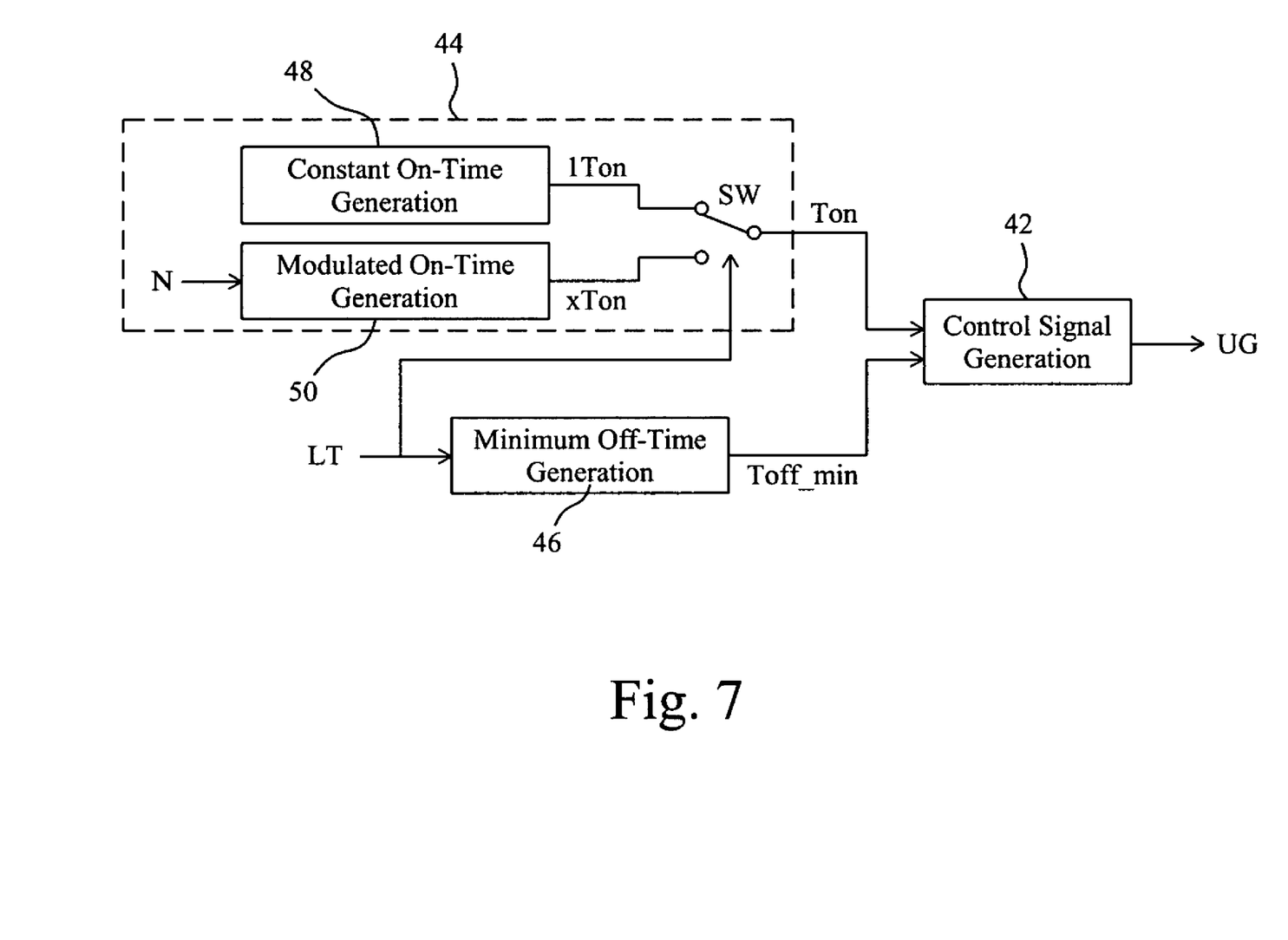
FIG. 7 shows an embodiment for the system of FIG. 6.

FIG. 6 shows a systematic block diagram according to the present invention, which comprises a functional block 42 for generation of the control signal UG for a power stage of a converter, for example the power stage 14 of FIG. 1, two functional blocks 44 and 46 for generation of the on-time Ton and the minimum off-time Toff_min, and a state signal LT, which is set according to load conditions to represent if a load transient happens, controls the functional block 44 to produce a constant on-time or a modulated on-time. Under the control of the state signal LF, the converter will operate with a constant on-time in steady state and operate with a modulated on-time in load transient. FIG. 7 shows an embodiment for the functional block 44 of FIG. 6, which comprises a functional block 48 for determining a constant on-time 1Ton, a functional block 50 for determining a modulated on-time xTon which is variable and longer than the constant on-time 1Ton but shorter than a predetermined maximum NTon, and a switch SW is controlled by the state signal LT to select either the constant on-time 1Ton or the modulated on-time xTon for the output Ton of the functional block 42. The minimum off-time Toff_min is also variable. The state signal LT controls the minimum off-time Toff_min to be a constant in steady state, and to be longer than the constant when the modulated on-time xTon is equal to the maximum NTon in load transient.

With the help of the control circuit shown in FIG. 4 to prolong the on-time Ton in load transient, although the output voltage Vout of a constant on-time PWM switching converter will recover to the original level more quickly, it may lead the inductor current IL in the power stage 14 to have greater ripple. As a result, when an output short circuit or over load occurs in the system, the inductor L may be saturated, which is not preferred and is always avoided by the system designer.

Figure 8:
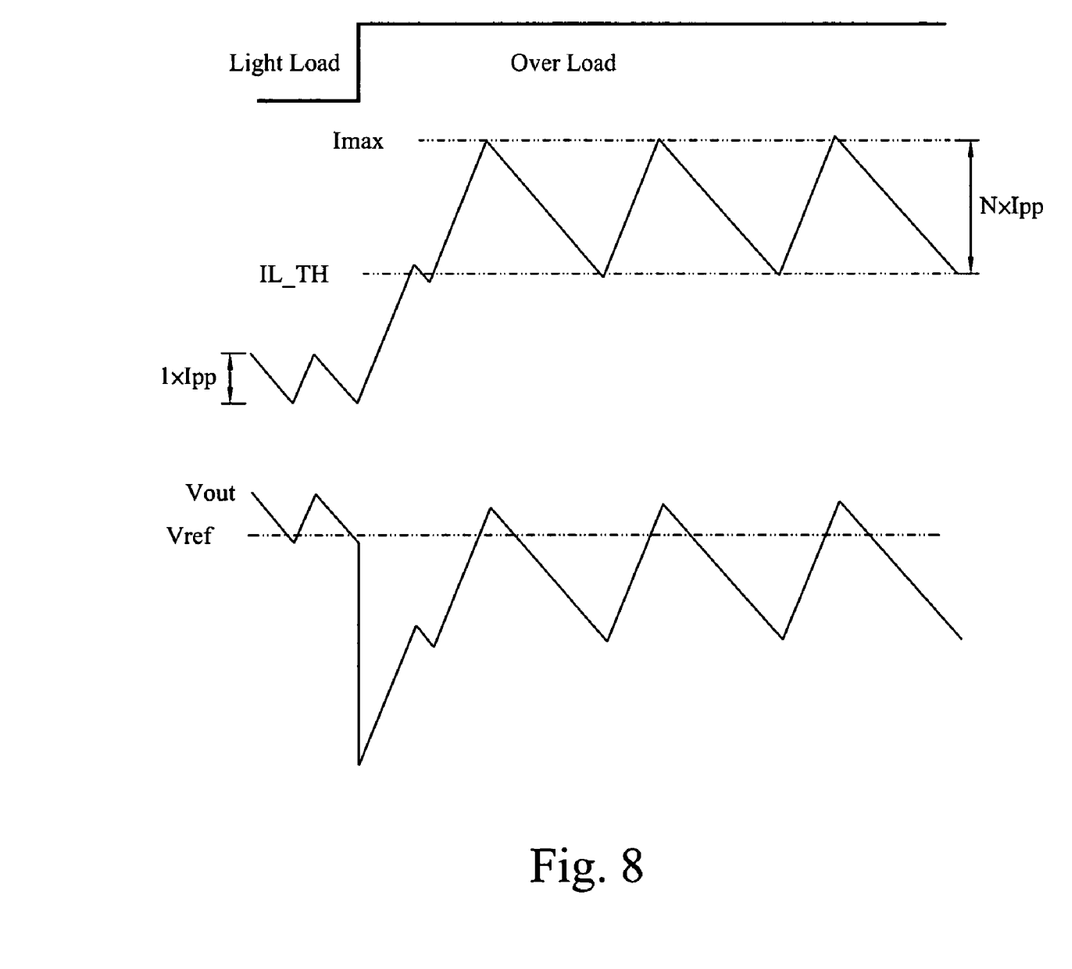
FIG. 8 is a waveform diagram of the inductor current when the control circuit of FIG. 4 is used for a constant on-time PWM switching converter.
Figure 9:
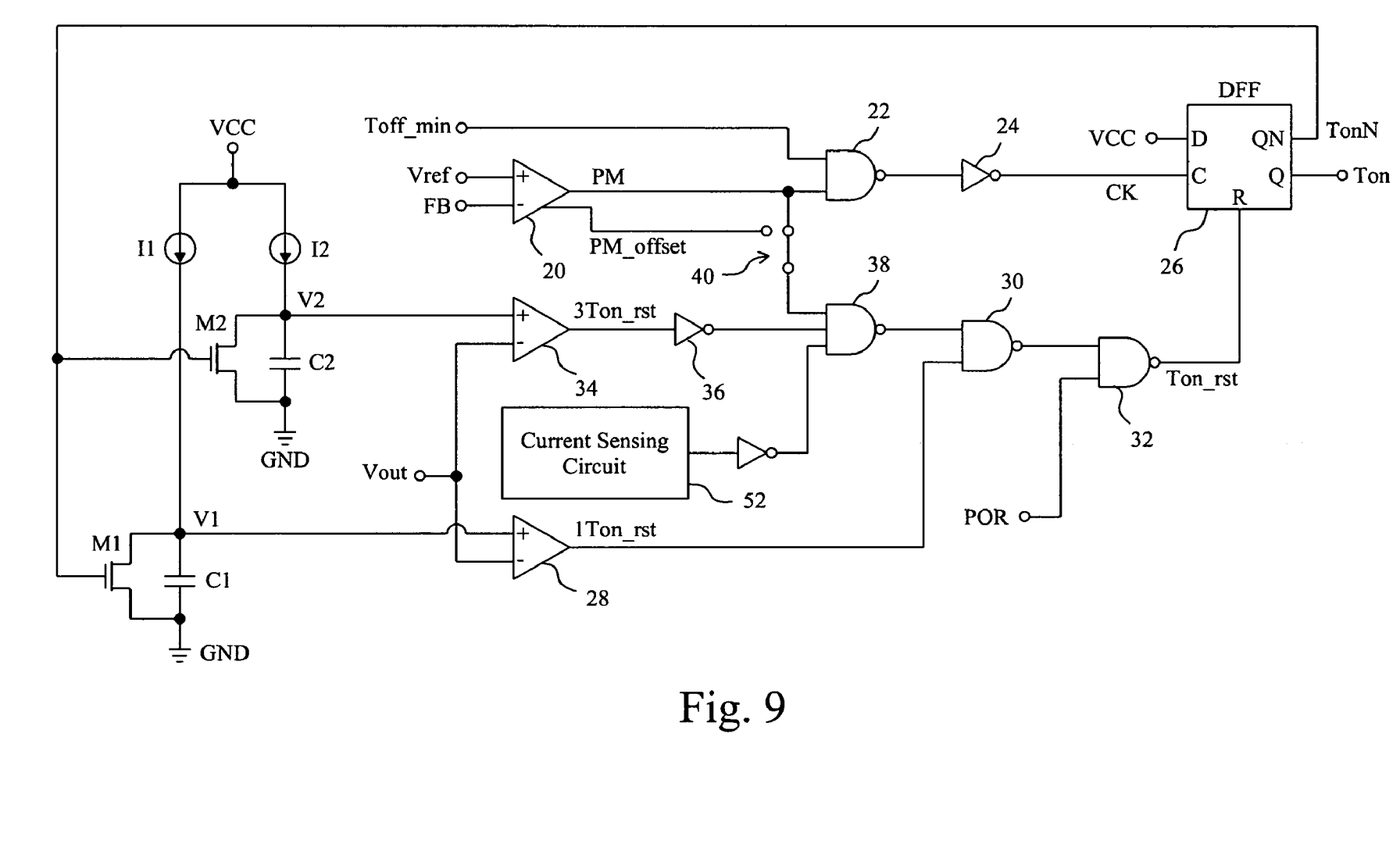
FIG. 9 shows a control circuit for preventing the inductor of a constant on-time PWM switching converter from saturated when an output short circuit or over load occurs.
Figure 10:
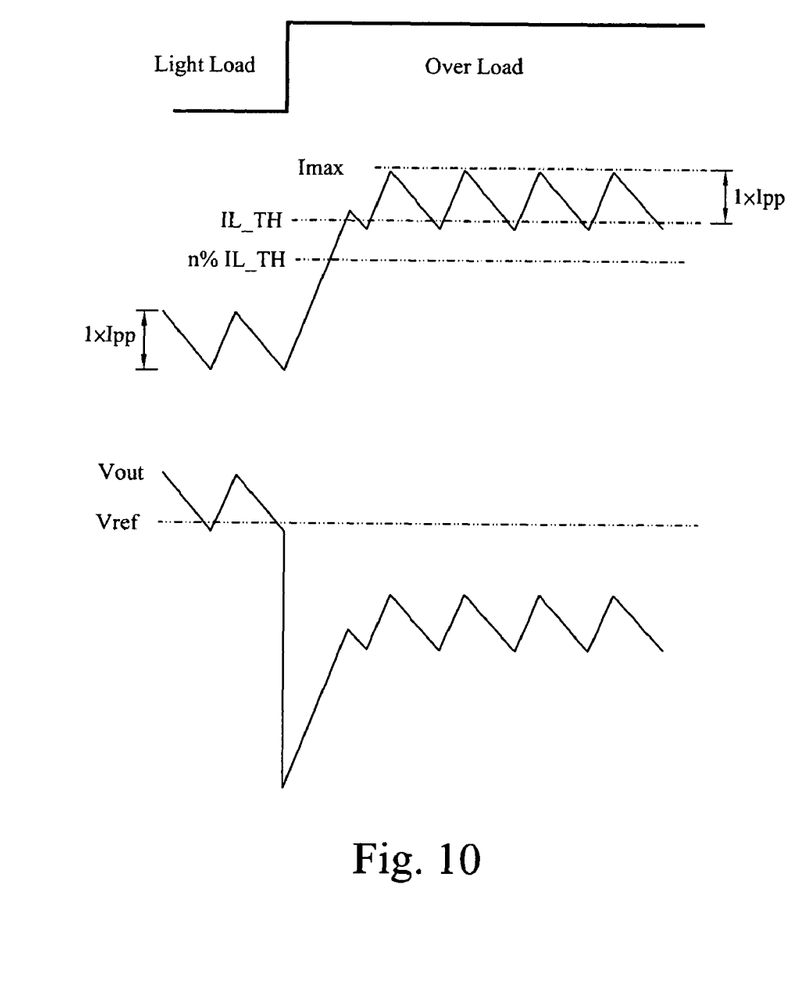
FIG. 10 is a waveform diagram of the inductor current when the control circuit of FIG. 9 is used for a constant on-time PWM switching converter at over load.

FIG. 8 is a waveform diagram of the inductor current IL when the system suffers an over load. In load transient, due to the over load, the inductor current IL will increase to reach the current limit threshold IL_TH, and with the on-time prolonged to be N times of the constant on-time, the ripple Ipp of the inductor current IL is amplified by N times, i.e., the maximum Imax of the inductor current IL will be IL_TH+N× IPP. To prevent the inductor L from being saturated, a protection mechanism is further provided to disable the on-time prolonging mechanism when an output short circuit or over load occurs. For example, as shown in FIG. 9, a current sensing circuit 52 senses the inductor current IL to determine a signal connected to an input of the NAND gate 38. In load transient, if the inductor current IL does not exceed a preset threshold, for example n % of the current limit threshold IL_TH, the control circuit will prolong the on-time to improve the efficiency and to speed up the recovery of the output voltage Vout, as illustrated by the above embodiments. Once the inductor current IL reaches n % of the current limit threshold IL_TH as shown in FIG. 10, the output of the current sensing circuit 52 will block the reset signal 3Ton_rst by the NAND gate 38, thereby disabling the on-time prolonging mechanism. As a result, the ripple of the inductor current IL changes back to the original Ipp, and the maximum Imax of the inductor IL becomes IL_TH+Ipp, so as to prevent the inductor L from being saturated.

Figure 11:
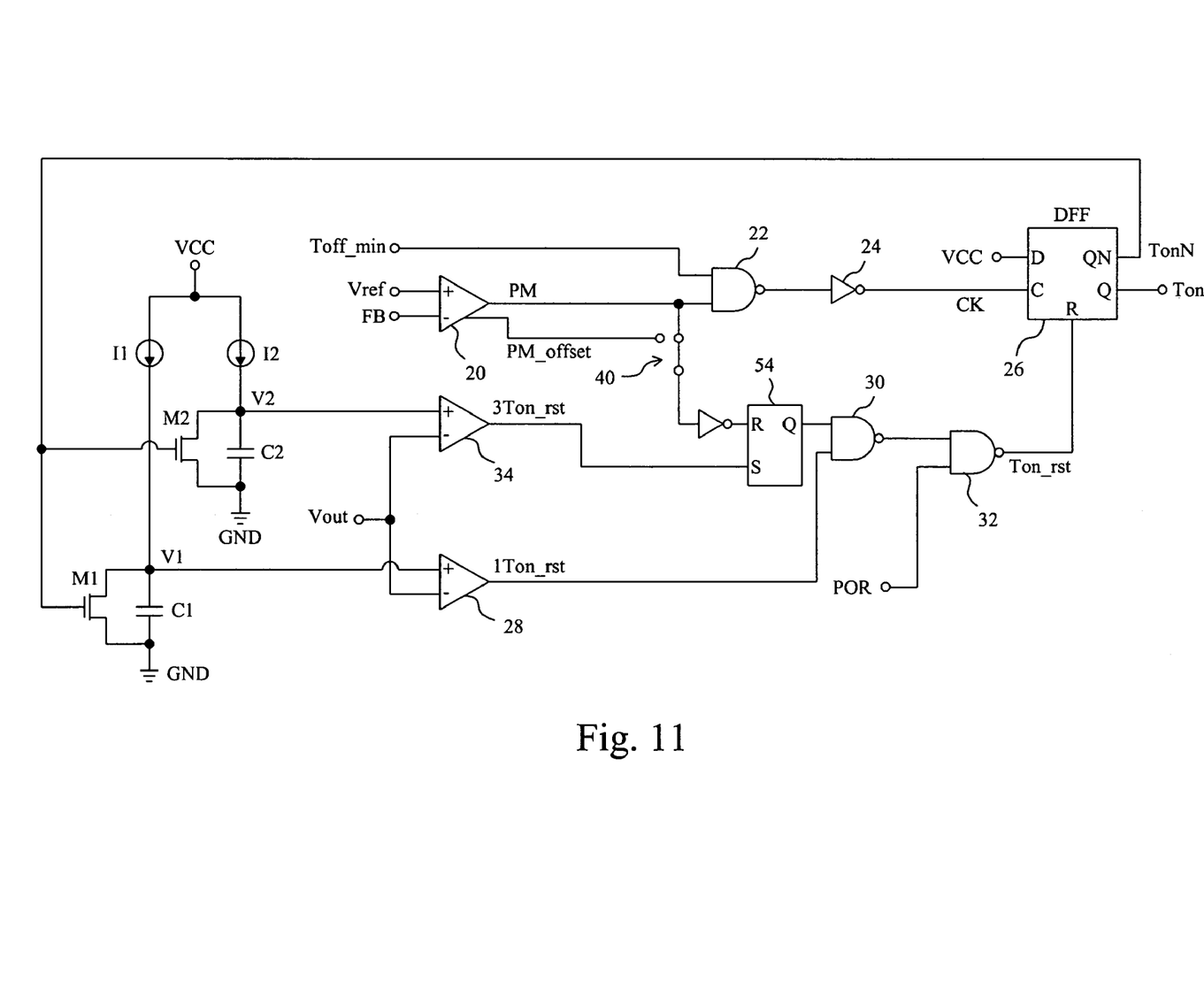
FIG. 11 shows another control circuit for preventing the inductor of a constant on-time PWM switching converter from saturated when an output short circuit or over load occurs.

An alternative method to prevent the inductor L from being saturated is to disable the on-time prolonging mechanism after the on-time is prolonged for several times in a load transient. For example, only the first on-time in a load transient is prolonged. By this way, even though an output short circuit or over load occurs, the inductor L will not be saturated. A control circuit to implement this method is shown in FIG. 11, which replaces the NAND gate 38 of FIG. 4 with an SR latch 54. In steady state, the relay 40 is tripped and so disconnects the output PM of the comparator 20 from the reset input R of the SR latch 54, which keeps the SR latch 54 at reset state so as to block the reset signal 3Ton_rst. In load transient, the signal PM_offset closes the relay 40 and so connects the pulse modulation signal PM to the reset input R of the SR latch 54. The high level of the pulse modulation signal PM allows the reset signal 3Ton_rst to pass through the SR latch 54 to input to the NAND gate 30. However, after the first pulse of the reset signal 3Ton_rst passes through the SR latch 54 to input to the NAND gate 30, the SR latch 54 latches and so blocks the other portion of the reset signal 3Ton_rst. Even though the converter does not escape from the load transient, it is the reset signal 1Ton_rst to reset the D-type flip-flop 26 thereafter. After the converter escapes from the load transient, the relay 40 is tripped again and the converter goes back to steady state operation.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for determining an on-time for a constant on-time PWM switching converter to produce an output voltage and an inductor current, the control circuit comprising:
   a first circuit for producing a first signal to trigger the on-time of the converter; and
   a second circuit for producing a second signal to terminate the on-time, the on-time being terminated to have a first constant duration when the converter operates in a first state, the second circuit terminating the on-time to have a second constant duration when the converter operates in a second state responsive to a decrease in the output voltage beyond a threshold value, the second constant duration being greater than the first constant duration.

2. The control circuit of claim 1, wherein the first circuit comprises a comparator for comparing an output voltage dependent signal with a reference signal to produce a third signal for determining the first signal.

3. The control circuit of claim 1, further comprising an off-time signal for determining a minimum off-time duration following the on-time, wherein the minimum off-time duration is of a third constant duration when the converter operates in the first state, and is of a fourth constant duration when the converter operates in the second state, the fourth constant duration being greater than the third constant duration.

4. The control circuit of claim 1, wherein the second circuit comprises:
a signal generator for producing an on-time dependent signal; and
a comparator for comparing the on-time dependent signal with an output voltage dependent signal to produce a third signal having a pulse width of the second duration.

5. The control circuit of claim 2, wherein the first circuit further comprises a gating circuit for producing the first signal according to the third signal and an off-time signal.

6. The control circuit of claim 4, wherein the signal generator comprises:
a current source for providing a current;
a capacitor for being charged by the current to produce the on-time dependent signal; and
a switch for controlling a charging time of the capacitor according to a second on-time dependent signal.

7. The control circuit of claim 6, wherein the second circuit further comprises:
a second current source for providing a second current;
a second capacitor for being charged by the second current to produce a fourth signal;
a second switch for controlling a charging time of the second capacitor according to the second on-time dependent signal; and
a second comparator for comparing the fourth signal with the output voltage dependent signal to produce a fifth signal having a pulse width of the first duration.

8. The control circuit of claim 7, wherein the first current and the second current have a ratio therebetween equal to a ratio of the first duration to the second duration.

9. The control circuit of claim 7, wherein the first current source comprises a first transistor for producing the first current, the second current source comprises a second transistor for producing the second current, and the first and second transistors are common gate and have a size ratio therebetween equal to the ratio of the first duration to the second duration.

10. The control circuit of claim 7, wherein the second circuit further comprises a gating circuit for producing a sixth signal in response to a state signal, wherein the sixth signal is equal to the third signal in the second state.

11. The control circuit of claim 10, wherein the second circuit further comprises a second gating circuit for selecting between the fifth and sixth signals to determine the second signal.

12. The control circuit of claim 10, wherein the second circuit further comprises a third comparator for comparing a second output voltage dependent signal with a reference signal to determine the state signal.

13. The control circuit of claim 11, further comprising a third circuit for blocking the sixth signal when the inductor current reaches a threshold.

14. The control circuit of claim 11, further comprising a third circuit for blocking the sixth signal when the pulse of the sixth signal appears a number of times.

15. The control circuit of claim 13, wherein the third circuit comprises a current sensing circuit for sensing the inductor current.

16. The control circuit of claim 14, wherein the third circuit comprises a latch circuit for blocking the sixth signal.

17. A control method for determining an on-time for a constant on-time PWM switching converter to produce an output voltage and an inductor current, the control method comprising the steps of:
producing a first signal for triggering the on-time of the converter; and
producing a second signal for terminating the on-time, the on-time being terminated to have a first constant duration when the converter operates in a first state the on-time being terminated to have a second constant duration when the converter operates in a second state responsive to a decrease in the output voltage beyond a threshold value, the second constant duration being greater than the first constant duration.

18. The control method of claim 17, wherein the step of producing a first signal comprises the step of comparing an output voltage dependent signal with a reference signal for producing a third signal to determine the first signal.

19. The control method of claim 17, further comprising the step of determining a minimum off-time duration of an off-time signal for following the on-time, wherein the minimum off-time duration is of a third constant duration when the converter operates in the first state, and is of a fourth constant duration when the converter operates in the second state, the fourth constant duration being greater than the third constant duration.

20. The control method of claim 17, wherein the step of producing a second signal comprises the steps of:
producing an on-time dependent signal; and
comparing the on-time dependent signal with an output voltage dependent signal for producing a third signal having a pulse width of the second duration.

21. The control method of claim 18, wherein the step of producing a first signal further comprises the step of determining the first signal according to the third signal and an off-time signal.

22. The control method of claim 20, wherein the step of producing an on-time dependent signal comprises the steps of:
providing a current;
charging a capacitor by the current for producing the on-time dependent signal; and
controlling a charging time of the capacitor according to a second on-time dependent signal.

23. The control method of claim 22, wherein the step of producing a second signal further comprises the steps of:
providing a second current;
charging a second capacitor by the second current for producing a fourth signal;
controlling a charging time of the second capacitor according to the second on-time dependent signal; and
comparing the fourth signal with the output voltage dependent signal for producing a fifth signal having a pulse width of the first duration.

24. The control method of claim 23, wherein the first current and the second current have a ratio therebetween equal to a ratio of the first duration to the second duration.

25. The control method of claim 23, wherein the step of producing a second signal further comprises the step of producing a sixth signal in response to a state signal, wherein the sixth signal is equal to the third signal at the second state.

26. The control method of claim 25, wherein the step of producing a second signal further comprises the step of selecting between the fifth and sixth signals to determine the second signal.

27. The control method of claim 25, wherein the step of producing a second signal further comprises the step of comparing a second output voltage dependent signal with a reference signal to determine the state signal.

28. The control method of claim 26, further comprising the step of blocking the sixth signal when the inductor current reaches a threshold.

29. The control method of claim 26, further comprising the step of blocking the sixth signal when the pulse of the sixth signal appears a number of times.

30. A constant on-time PWM switching converter, comprising:
a power stage for converting an input voltage to an output voltage; and
a control circuit for determining an on-time and a minimum off-time of a control signal for switching of the power stage, the control circuit including:
(a) a pulse width modulator circuit for establishing a signal corresponding to a change in the output voltage; and
(b) a gating circuit coupled to the pulse width modulator circuit and the power stage for generating the control signal, the control signal having a constant on-time of a first duration during a first operating state of the converter and a constant on-time of a second duration during a second operating state of the converter where the output voltage decreases beyond a threshold value, the second constant duration being greater than the first constant duration, the gating circuit having an input coupled to an off-time signal for establishing a minimum off-time following the constant on-time, the minimum off-time being of a third constant duration when the converter operates in the first state, and being of a fourth constant duration when the converter operates in the second state, the fourth constant duration being greater than the third constant duration.

31. The converter of claim 30, wherein the power stage is a boost power stage, a buck power stage, or an inverting power stage.

32. A control method of a constant on-time PWM switching converter to produce an output voltage and an inductor current, the control method comprising the steps of:
generating a pulse width modulated signal for triggering an on-time of a switching control signal of the converter, the pulse width modulated signal being generated responsive to a comparison of an output voltage dependent signal with a reference signal;
producing a reset signal for terminating the on-time of the switching control signal, the on-time being terminated to have a first constant duration when the converter operates in a first state and the on-time being terminated to have a second constant duration when the converter operates in a second state responsive to a decrease in the output voltage beyond a threshold value, the second constant duration being greater than the first constant duration; and
determining a minimum off-time duration of an off-time of the switching control signal, the minimum off-time duration being of a third constant duration when the converter operates in the first state, and being of a fourth constant duration when the converter operates in the second state, the fourth constant duration being greater than the third constant duration.

* * * * *